R. R. Frohock.
Last Mach.

N°88,029. Patented Mar. 23, 1869.

Witnesses,
Frank G. Parker
A. Henri Berry

Inventor,
Roscoe Ray Frohock

R. R. Frohock.
Last Mach.
No. 88,029. Patented Mar. 23, 1869.

Witnesses,
Frank G. Parker
A. Hun Berry

Inventor,
Roscoe Ray Frohock.

United States Patent Office.

ROSCOE R. FROHOCK, OF BOSTON, MASSACHUSETTS.

Letters Patent No. 88,029, dated March 23, 1869.

IMPROVEMENT IN LAST-MACHINE.

The Schedule referred to in these Letters Patent and making part of the same.

*To all whom it may concern:*

Be it known that I, ROSCOE R. FROHOCK, of Boston, in the county of Suffolk, and State of Massachusetts, have invented certain new and useful Improvements in Last-Machines; and I do hereby declare that the following is a full and exact description thereof, reference being had to the accompanying drawings, and to the letters of reference marked thereon.

To enable others skilled in the art to make and use my invention, I will proceed to describe its nature, construction, and operation.

The nature of my invention consists—

First, in hanging the guide upon one swinging frame, and the cutter-wheel upon another, one swinging frame being connected to a sliding bar, which is parallel to and connected with, by a peculiar device, a second bar, to which the other swinging frame is connected, the distance from the point of contact of the guide to the axis of oscillation of the guide-frame being equal to the distance of the cutting-point of the cutting-wheels from the axis of oscillation of the cutter-wheel frames.

Second, connecting the guide swinging frame to the cutter-wheel swinging frame, by means of links, which pivot upon prolongations of the guide-frame, and are connected with slides, which are movable upon a graduated arc, connected with the cutter-wheel swinging frame, said arc coinciding with circumference of circle, which has its centre at the aforementioned pivot when the guide coincides with the axis of the model.

Third, connecting the two sliding bars which carry the guide-frame and cutter-wheel frame, by means of two links and an adjustable bar and slide, the whole so arranged that the relative longitudinal motion of the two sliding bars may be varied at will.

Drawings.

Construction.

A A′ A″, in all the drawings, represent the frame of the machine, to which all the working-parts are attached.

Figure 1:
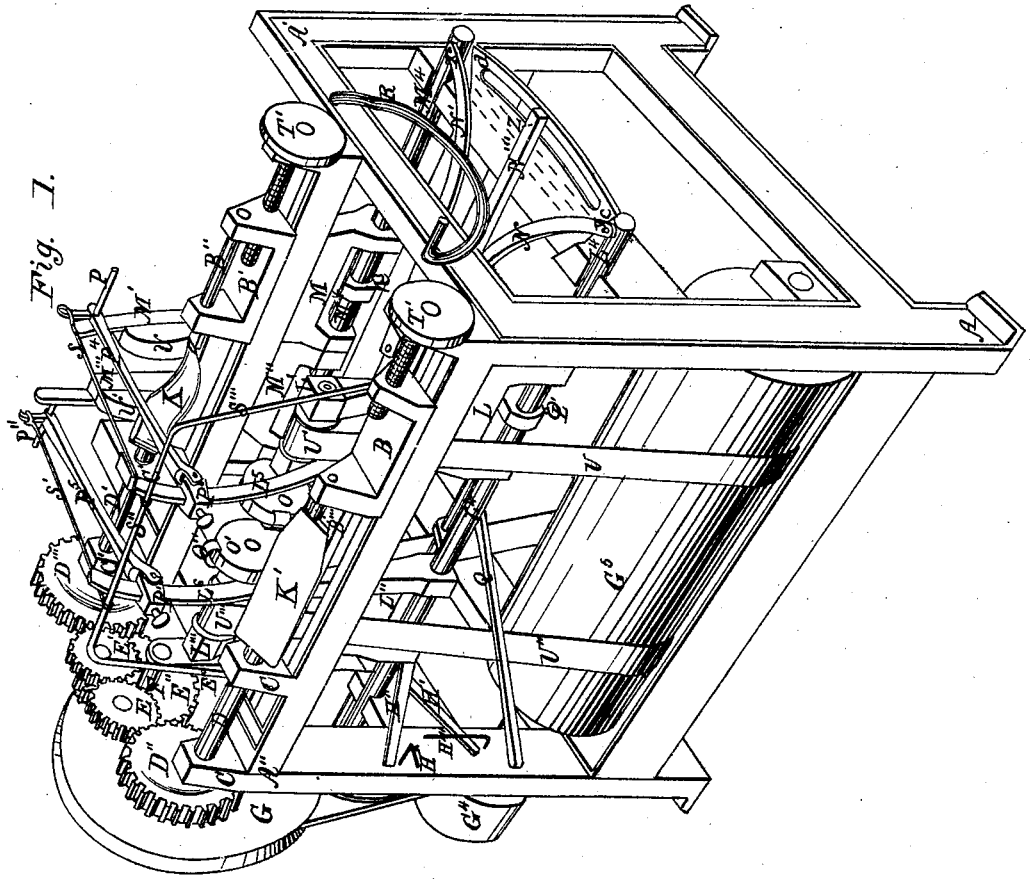
Figure 1 is a perspective view of my machine.

B, fig. 1, is a tail-block, which slides upon ways, and is operated by the hand-screw T.

B‴ is a centre, attached to the tail-block B, which, together with the mandrel D, serves to hold and revolve the block K′, the mandrel D being propelled by the gear-wheel D″.

B′ is a tail-block, which slides upon ways, and is operated by the hand-screw T′.

B″ is a mandrel, attached to the tail-block B′, which, together with the mandrel D′, serves to hold and revolve the model, K, the mandrel D′ being propelled by the gear-wheel D‴.

E and E′, fig. 1, are two gears, running upon journals, inserted in a third, and larger gear, E″, the gear E″ being held in position by the stud F, upon which it may revolve, and the stop E‴.

These three gears, namely, E E′ E″, are so arranged, in combination with the gears D″ and D‴, which operate the block K′ and model K, that if E and E′ mesh into D″ and D‴, as represented in the drawings, then the model will revolve in an opposite direction to that of the block, so that the last, cut, will be for the opposite foot to the model; that is to say, if the model is left, the last will be right, and *vice versa.*

If the gear E″ is slipped forward on the stud F, and freed from the stop E‴, so as to mesh into the gears D″ and D‴, then the two gears, D″ and D‴, and consequently the model and block, will revolve in the same direction, the gear E″ having the same number of teeth that the gears D″ and D‴ have, so that the last, cut, will be for the same foot; that is, if the model is left, the last will be left, and *vice versa.*

L L′ and L″ L‴, fig. 1, represent the swinging frame, to which the cutter-wheels, O and O′, are attached.

Figure 3:
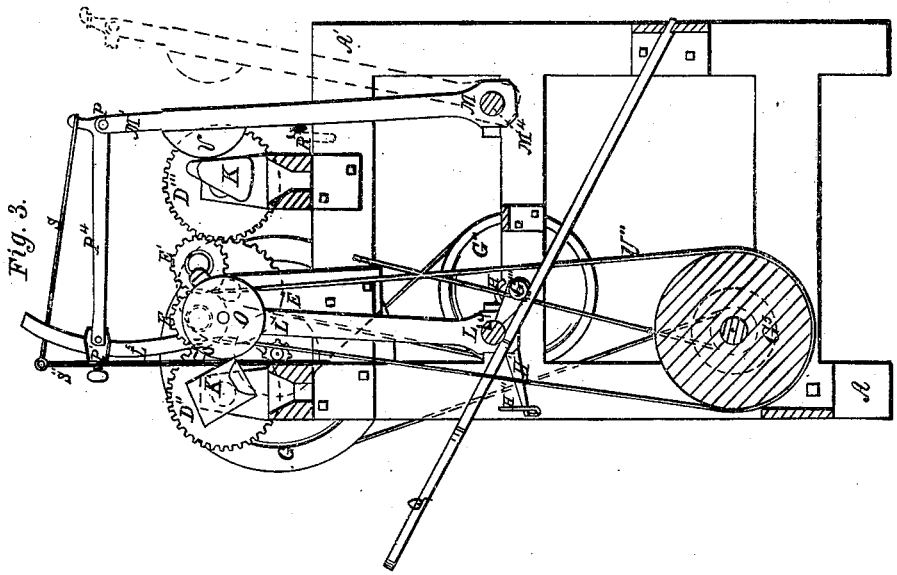
Figure 3 is a cross-vertical section of the same.
Figure 2:
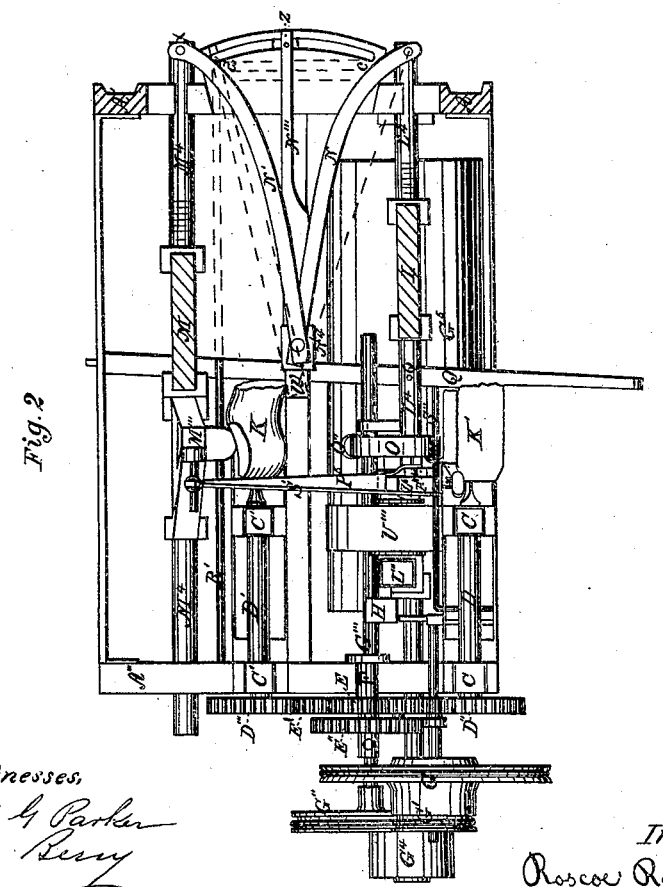
Figure 2 represents my machine, partly in plan and partly in horizontal section.

These frames, one of which, L L′, is shown in section in fig. 3, swing upon the sliding rod $L^4 L^4$, figs. 1, 2, and 3, but cannot move longitudinally upon said rod.

M M′ and M″ M‴, fig. 1, represent the swinging frames, to which the guides V V′ are attached.

These frames, one of which is also shown in section, in fig. 3, swing upon the sliding rod $M^4 M^4$, figs. 1, 2, and 3, but cannot move longitudinally upon said rod.

$P^1$ is a link, one end of which is connected to the prolongation of one of the guide-frames by the pivot P, the other end being connected to the slide P, as shown, which is so arranged that it may be made fast by means of the thumb-screw, at any desired point on the arc $L^5$.

$L^5 L^6$ are curved prolongations of the cutter-wheel swinging frames, and are so formed as to coincide with the arc of a circle, struck from the pivot P as a centre, when the guide V is at the axis of the model, the reason for which will be explained hereafter.

The sliding rod $L^4$, figs. 1 and 2, to which the cutter-wheel swinging frames are attached, is connected to the corresponding sliding rod $M^4$, to which the guide swinging frames are attached, by means of the links N N′.

These links are pivoted to the ends of the sliding bars $L^4 M^4$, and also swing on a common pivot at N″, fig. 2, which unites them to a sliding box N*.

N‴ is an adjusting-bar, swinging upon the pivot W, fig. 2, the end Z being held in any desired position by a thumb-screw working in a slot, as shown.

The operation of this device for regulating the relative motion by the sliding bars $L^4 M^4$, and, through them, the guides and cutter-wheels, may be explained as follows:

As the links N and N′ are of the same length, and as the distance from N″ to W is common, the two distances W N″ $x$, and W N″ $y$, will always be equal.

If we complete the triangles W N″ $x$ and W N″ $y$, by drawing the lines W $x$ and W $y$, it will be seen that the base W y will be longer than the base W x, when the angle W N" y is larger than the angle W N" x; but to make this angle larger, we have only to move the bar N''' toward y. When the bar is so moved, as indicated by the dotted lines, any movements of L⁴ will lengthen the base-line N" y, and cause N to slide along on N''', thus reducing the angle W N" y, and increasing the angle W N" x; in other words, making the base line W x proportionally shorter than the base-line W y, so that the sliding bar L⁴, which carries the cutters, will traverse a longer distance than the sliding bar M⁴ which carries the guides, so that the last, cut, will be longer than the model, and proportionally exact in length.

If N''' be carried toward x, the reverse of this action will take place, that is, the last cut will be shorter than the model.

When the adjusting-bar is exactly in the centre, M⁴ and L⁴ will move together, and the last will be of the same length as the model. If the sliding bars L⁴ M⁴ are thrown clear back, so that the guides and cutting-wheels are in position, then the pivot at N" will be exactly over the pivot W, so that the adjusting-bar N''' may be set in any desired position, without causing L⁴ or M⁴ to move.

The guide swinging frame M M, is held on the sliding bar M⁴ by means of a clamp and set-screw, b, fig. 1, so that it may be moved longitudinally when desired. This adjustment becomes necessary to accommodate models of different lengths, the two guides V and V' being set so that the distance between their points of contact shall be about half the length of the model.

The cutter-wheel swinging frame L' L is held on the sliding bar L⁴ by means of a clamp and set-screw, b', fig. 1, so that it may be moved longitudinally when desired. This adjustment becomes necessary when it is desired to make lasts of different lengths, the distance between the cutting-points of the two cutter-wheels being about half the length of the last to be cut. For convenience in making these adjustments, divisions are marked off on the sliding rods L⁴ M⁴, as shown in fig. 2.

H' and H" are two levers, attached to the sliding bar L⁴. The inner ends of these levers each form the half of a screw-nut, which clasp over the screw G''', as indicated by H, in figs. 2 and 3. When the levers H' H", fig. 1, are brought together, the said half screw-nuts close tightly around the screw G''', and the revolution of G''' will cause a longitudinal motion of the screw-nut, and consequently a longitudinal motion of L⁴ M⁴, which carry the cutter-wheels and guides.

The two levers H' H" are held together by a spring-clasp, H''', figs. 1 and 3, but when the sliding rod L⁴ has been moved the desired distance by the action of the screw G''', acting in the screw-nut H, then the clasp H''' is thrown off by the staple H⁴, inserted in the frame of the machine, (see fig. 1,) and the levers H' H" open, and thus free the screw-nut from the action of the screw G'''.

When it is desirable to change the block, or last, the swinging frames may be thrown back, as represented by dotted lines in fig. 3, by means of the crank and crank-shaft R R', figs. 2 and 3.

The lever Q is connected to the sliding bar L⁴, by the pivot Q', and is used to slide back longitudinally-swinging frames, when the machine has completed a last, and place them in position to begin a new last.

I will now proceed to describe the mode of action of the guide-frames and cutter-wheel frames.

The distance between the mandrel, upon which sets last and block turn, is equal to the distance between the sliding rods, and also the distance between the pivot P and the slide P'.

The distance from the point of oscillation of the guide swinging frames to the contacting point of the guides is equal to the distance from the point of oscillation of the cutter-wheel swinging frames to the contacting point of the cutters. And further, as the prolongations L⁵ L⁶, from the cutter-wheel swinging frames, are in arcs of circles, struck from the pivots P P", when the contacting points of the guides V V' are at the centre of revolution of the model, the cutting-points of the cutter-wheels are at the centre of revolution of the block, and this will be true for all positions of the slides P' P''' on the arcs L⁵ L⁶, so that when the guides move away from or toward the centre, the cutter-wheels have a corresponding motion, and the last is made of the same size, or larger or smaller, and exactly proportional, accordingly as the slides P' P''' are located on the arcs L⁵ L⁶.

If the links P⁴ P⁵ are parallel to lines connecting the centres of oscillation of the swinging frames, then the oscillation of the cutter-wheels will be the same as the oscillation of the guides, so that the last, cut, will be of the exact size of the model.

If the slides P' P''' are carried up toward the top of the arcs L⁵ L⁶, then the motion of the cutter-wheels will be less than the motion of the guides, so that the last, made, will be smaller than the model.

If the slides P' P''' are carried down to the bottom of the arcs L⁵ L⁶, then the motion of the cutter-wheels will be greater than the motion of the guides, and the last, cut, will be larger than the model.

The arcs L⁵ L⁶ have division-lines marked upon them, for convenience in adjusting the machine for lateral variation in the dimensions of the last.

The plate c d, over which the bar N''' moves, is also provided with division-lines, for convenience in adjusting the machine for variations in the length of the last.

S and S' are springs, connecting the swinging guide frames to the brace S", and serve to press the guides steadily against the model, and also to bring the cutter-wheels to act against the block.

The motive-power is communicated to the machine through the pulley G⁴, which, being attached to the same shaft with the drum G⁵, acts through the belts U U" to drive the cutter-wheels.

The wheel G operates the small pinion a, fig. 3, and through it the wheel D".

What I claim as my invention, and desire to secure by Letters Patent of the United States, is—

1. The arrangement of the guide swinging frame M and the cutter-wheel swinging frame L, when operating in combination with each other, as described, and for the purpose set forth.

2. The grading-device, consisting of the arc L⁵, attached to the swinging frame L, in combination with the slide P, link P⁴, and frame M, arranged to operate substantially as described and shown, and for the purpose set forth.

3. The combination of the sliding bars L⁴ M⁴, the links N N', the slide N", and the bar N''', when constructed and arranged to operate substantially as described, and for the purpose set forth.

ROSCOE R. FROHOCK.

Witnesses:
FRANK G. PARKER,
A. HUN BERRY.